(12) United States Patent
Wilson

(10) Patent No.: US 8,205,377 B1
(45) Date of Patent: Jun. 26, 2012

(54) BETTER RAT TRAP SYSTEM

(76) Inventor: Russell L. Wilson, Tarpon Springs, FL (US)

( * ) Notice: Subject to any disclaimer, the term of this patent is extended or adjusted under 35 U.S.C. 154(b) by 478 days.

(21) Appl. No.: 12/587,287

(22) Filed: Oct. 5, 2009

Related U.S. Application Data

(63) Continuation-in-part of application No. 12/583,119, filed on Aug. 14, 2009.

(51) Int. Cl.
*A01M 23/04* (2006.01)
(52) U.S. Cl. ...................... 43/69; 43/70; 43/71
(58) Field of Classification Search ............... 43/64, 69, 43/70, 71, 72, 74; 119/751, 752
See application file for complete search history.

(56) References Cited

U.S. PATENT DOCUMENTS

| | | | | | |
|---|---|---|---|---|---|
| 70,134 | A | * | 10/1867 | Trevitt | 43/70 |
| 107,532 | A | * | 9/1870 | Link | 43/69 |
| 376,246 | A | * | 1/1888 | Kunderd | 43/69 |
| 506,951 | A | * | 10/1893 | Stephens | 43/69 |
| 1,096,387 | A | * | 5/1914 | Pezzolo | 43/69 |
| 1,466,178 | A | * | 8/1923 | Lange | 43/69 |
| 1,520,557 | A | * | 12/1924 | Berg | 43/69 |
| 2,374,691 | A | * | 5/1945 | Middleton | 43/69 |
| 2,579,093 | A | * | 12/1951 | Roesner | 43/69 |
| 2,741,866 | A | * | 4/1956 | Shirley | 43/69 |
| 3,423,870 | A | * | 1/1969 | Kost | 43/69 |
| 3,791,065 | A | * | 2/1974 | Snow | 43/69 |
| 4,241,531 | A | * | 12/1980 | Nelson et al. | 43/69 |
| 4,706,407 | A | * | 11/1987 | Melton | 43/69 |
| 4,748,766 | A | | 6/1988 | Stimac | |
| 6,016,623 | A | | 1/2000 | Celestine | |
| 6,557,295 | B1 | * | 5/2003 | Alonso | 43/69 |
| 6,938,368 | B2 | * | 9/2005 | Guidry | 43/69 |
| 6,990,767 | B1 | * | 1/2006 | Margalit | 43/61 |
| 2006/0026893 | A1 | * | 2/2006 | Sears | 43/69 |

* cited by examiner

*Primary Examiner* — Rob Swiatek
*Assistant Examiner* — Justin Benedik

(57) ABSTRACT

A trash can has an open top, a recipient surface supporting a closed bottom, and a side wall. A ramp has a first end positioned on the recipient surface and a second end positioned on the top of the trash can. A pivotable member having upper and lower surfaces is pivotally supported at the second end of the ramp. The interior end of the pivotable member is located above the ramp and the exterior end is located above the trash can. The pivotable member is positionable in an attracting orientation with the interior end in contact with the ramp and the exterior end in a raised horizontal orientation. The pivotable member is positionable in a capturing orientation with the interior end raised above the ramp and the exterior end in a lowered angled orientation.

1 Claim, 7 Drawing Sheets

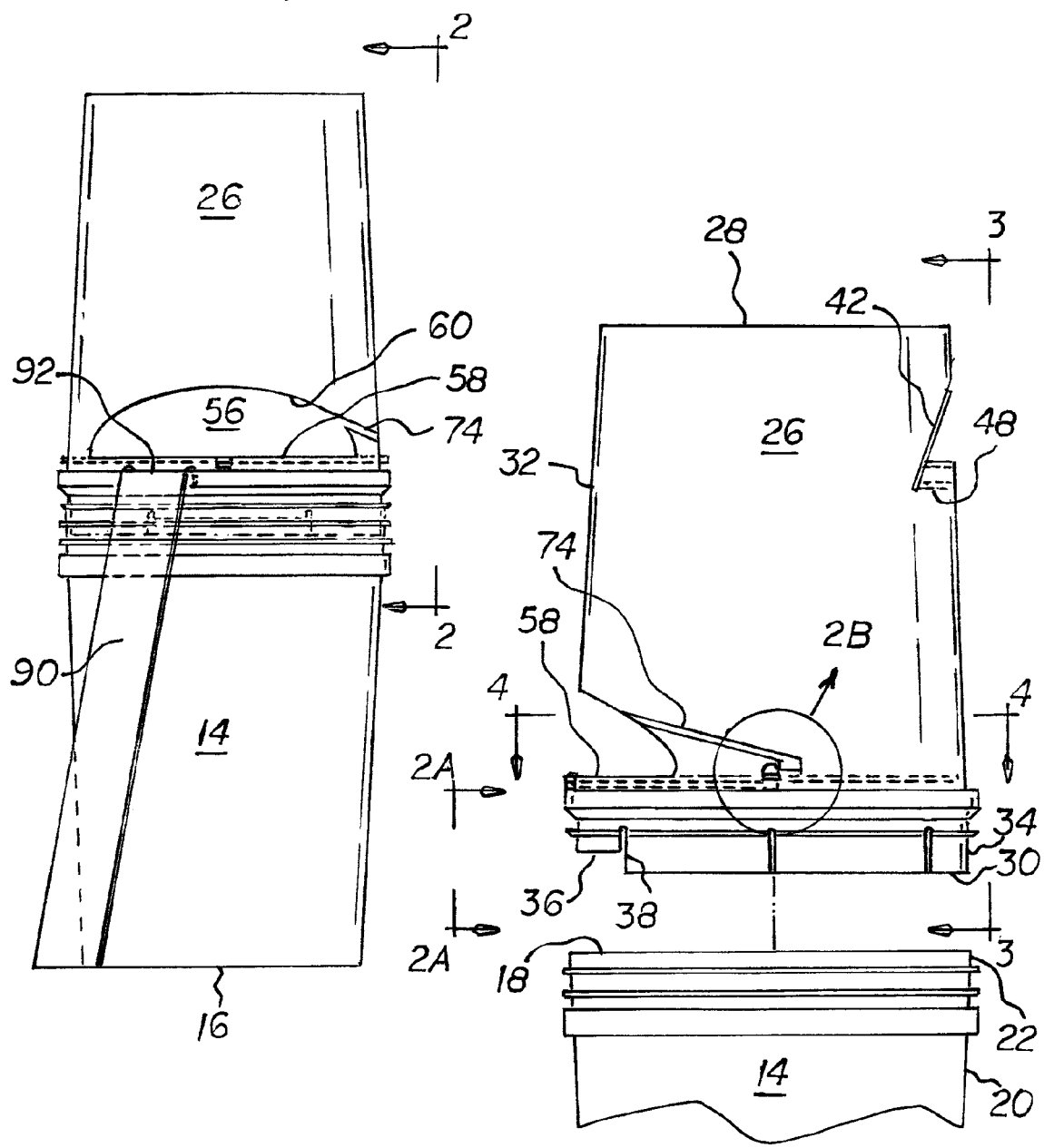

FIG 2A
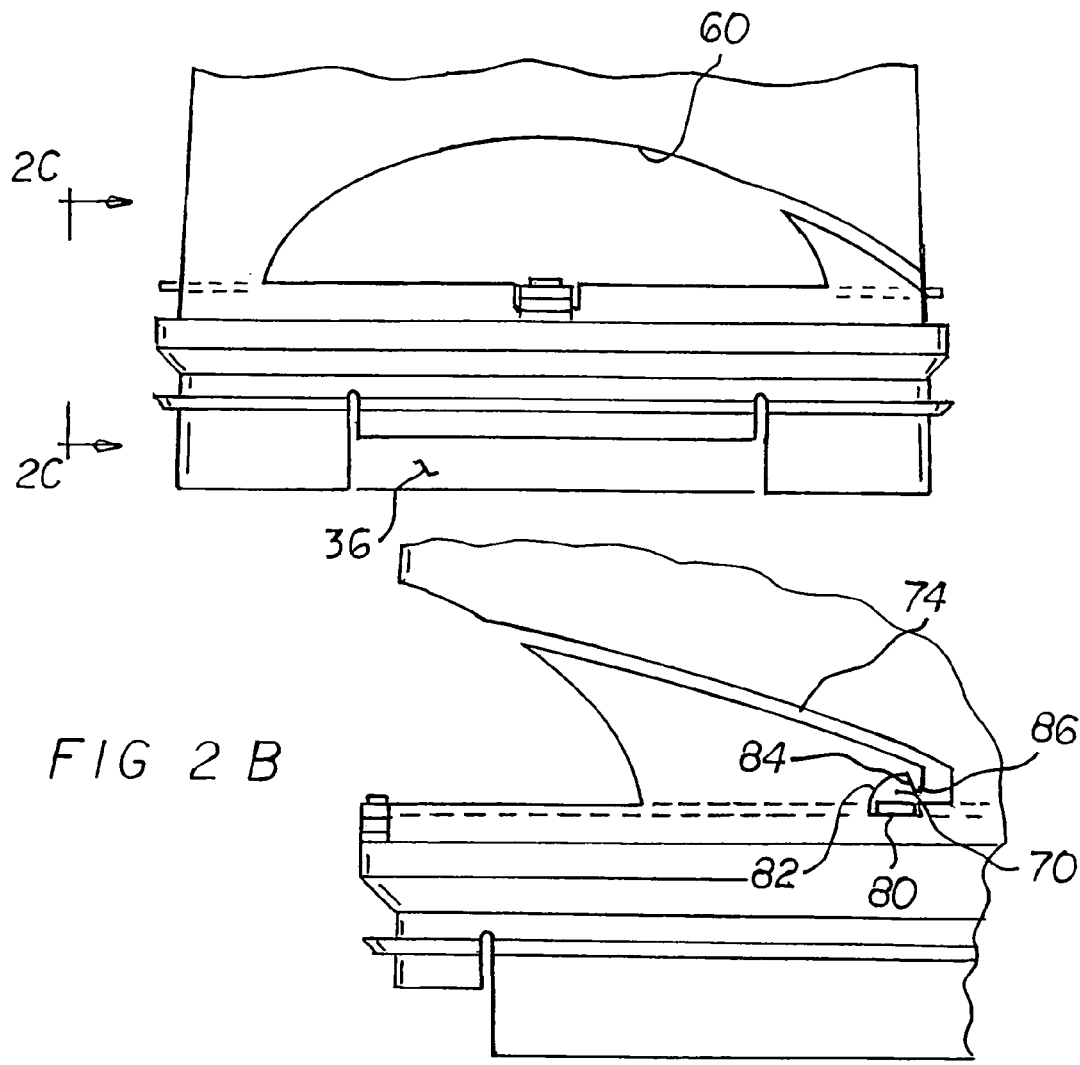
FIG 2B
FIG 2C
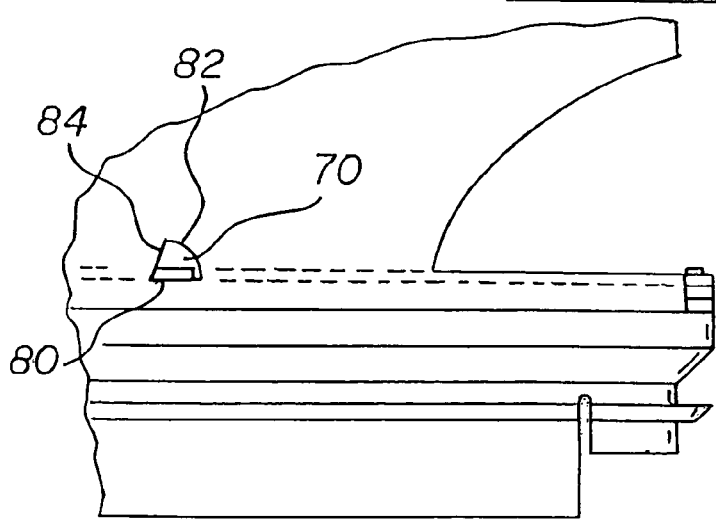

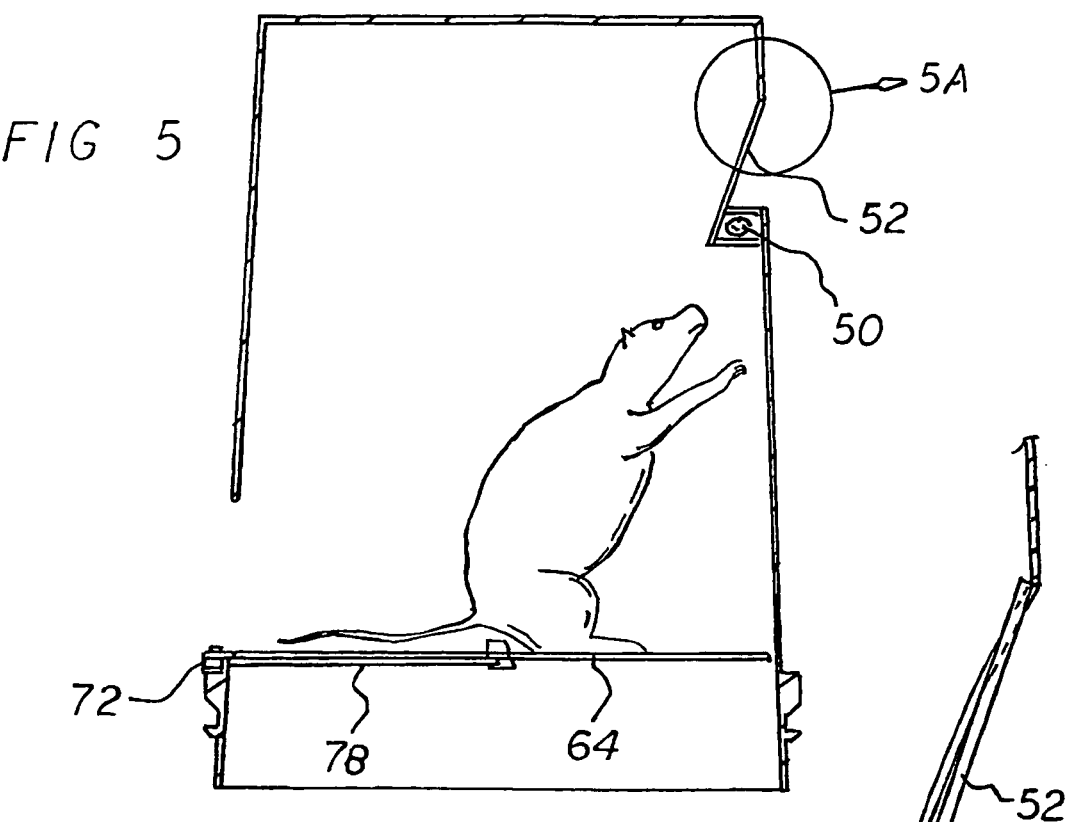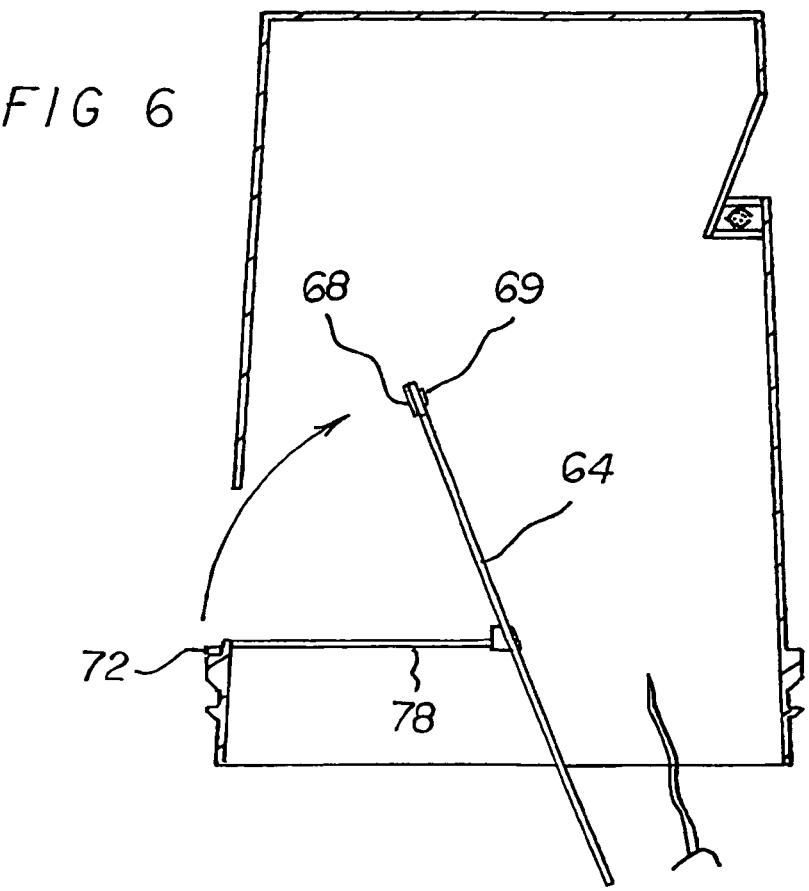

BETTER RAT TRAP SYSTEM

RELATED APPLICATION

The present application is a continuation-in-part of pending application Ser. No. 12/583,119 filed Aug. 14, 2009, the subject matter of which is incorporated herein by reference.

BACKGROUND OF THE INVENTION

1. Field of the Invention

The present invention relates to a better rat trap system and more particularly pertains to capturing, retaining and destroying rats and other undesirable animals and for releasing desirable animals, the capturing, retaining, and destroying and releasing being done in a safe, convenient and reliable manner.

2. Description of the Prior Art

The use of animal traps of known designs and configurations is known in the prior art. More specifically, animal traps of known designs and configurations previously devised and utilized for the purpose of trapping animals through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,748,766 issued Jun. 7, 1988 to Stimac relates to an Animal Trap and U.S. Pat. No. 6,016,623 issued Jan. 25, 2000, to Celestine relates to a Rodent Trap.

While these devices fulfill their respective, particular objectives and requirements, the aforementioned patents do not describe a better rat trap system that allows for capturing, retaining and destroying rats and other undesirable animals and for releasing desirable animals, the capturing, retaining, and destroying and releasing being done in a safe, convenient and reliable manner.

In this respect, the better rat trap system according to the present invention substantially departs from the conventional concepts and designs of the prior art, and in doing so provides an apparatus primarily developed for the purpose of capturing, retaining and destroying rats and other undesirable animals and for releasing desirable animals, the capturing, retaining, and destroying and releasing being done in a safe, convenient and reliable manner.

Therefore, it can be appreciated that there exists a continuing need for a new and improved better rat trap system which can be used for capturing, retaining and destroying rats and other undesirable animals and for releasing desirable animals, the capturing, retaining, and destroying and releasing being done in a safe, convenient and reliable manner. In this regard, the present invention substantially fulfills this need.

SUMMARY OF THE INVENTION

In view of the foregoing disadvantages inherent in the known types of animal traps of known designs and configurations now present in the prior art, the present invention provides an improved better rat trap system. As such, the general purpose of the present invention, which will be described subsequently in greater detail, is to provide a new and improved better rat trap system and method which has all the advantages of the prior art and none of the disadvantages.

To attain this, the present invention essentially comprises a better rat trap system for capturing, retaining and destroying rats and other undesirable animals. The capturing and retaining and destroying are done in a safe, humane, convenient and reliable manner. First provided is a trash can. The trash can has an open top and a closed bottom and a side wall in a frusto-conical configuration. The trash can is fabricated of a polymeric material. A recipient surface supports the bottom of the trash can.

Next provided is a ramp. The ramp has a lower first end and a raised second end. The ramp has an upper surface and a lower surface. The first end of the ramp is positioned on the recipient surface. The second end of the ramp is positioned on the top of the trash can. The ramp is split into a top half and a bottom half. A 180 degree hinge couples the upper and lower halves for movement between an extended attracting orientation and a retracted folded orientation.

Next provided is a pivotable member. The pivotable member is pivotally supported at the second end of the ramp. The pivotable member has an upper surface and a lower surface. The pivotable member has an interior end located above the ramp and an exterior end located above the trash can. The interior and exterior ends of the pivotable member are fixed with respect to each other at an angle of 135 degrees, plus or minus 10 percent. The pivotable member is positionable in an animal attracting orientation with the interior end of the pivotable member in contact with the ramp and the exterior end of the pivotable member in a raised horizontal orientation. The pivotable member is positionable in a rodent capturing orientation with the interior end of the pivotable member raised above the ramp and the exterior end of the pivotable member in a lowered angled orientation.

Next provided is a 45 degree hinge. The 45 degrees hinge has a fixed part secured to the lower surface of the ramp adjacent to the pivotable member. The 45 degree hinge has a movable part secured to the lower surface of the exterior section of the pivotable member adjacent to the interior section. The 45 degree hinge has a pivot pin coupling the fixed and movable parts of the hinge to thereby move the pivotable member between the attracting and capturing orientations.

Next, a stop block is provided. The stop block is secured beneath the fixed part of the hinge to limit the downward rotation of the pivotable member from the horizontal to a lowered 45 degrees, plus or minus 10 percent.

A plate is next provided. The plate is secured by nails to the upper surface of the exterior end of the pivotable member. The plate is fabricated of a hard material selected from the class of hard materials including metal and Formica to preclude an animal on the exterior end of the pivotable member from digging its claws into the pivotable member to abate falling into the trash can.

Next, a notch is provided in the upper surface of the pivotable member at the exterior end remote from the interior end. The notch functions to support bait to attract animals. Animals attracted by the bait climb up the ramp and across the interior end and then across the exterior end of the pivotable member and fall into the trash can due to the pivoting of the pivotable member.

Lastly provided is a pair of magnets, a first magnet on the lower surface of the pivotable member and a second magnet on the upper surface of the ramp. The magnets are held together when in the attract orientation awaiting the animal. The pivotable member is movable to the capture orientation with the magnets separated as a result of the animal walking to the exterior section of the pivotable member There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved better rat trap system which has all of the advantages of the prior art animal traps of known designs and configurations and none of the disadvantages.

It is another object of the present invention to provide a new and improved better rat trap system which may be easily and efficiently manufactured and marketed.

It is further object of the present invention to provide a new and improved better rat trap system which is of durable and reliable constructions.

An even further object of the present invention is to provide a new and improved better rat trap system which is susceptible of a low cost of manufacture with regard to both materials and labor, and which accordingly is then susceptible of low prices of sale to the consuming public, thereby making such better rat trap system economically available to the buying public.

Even still another object of the present invention is to provide a better rat trap system for capturing, retaining and destroying rats and other undesirable animals and for releasing desirable animals, the capturing, retaining, and destroying and releasing being done in a safe, convenient and reliable manner.

Lastly, it is an object of the present invention to provide a new and improved better rat trap system having a trash can with an open top, a recipient surface supporting a closed bottom, and a side wall. A ramp has a first end positioned on the recipient surface and a second end positioned on the top of the trash can. A pivotable member having upper and lower surfaces is pivotally supported at the second end of the ramp. The interior end of the pivotable member is located above the ramp and the exterior end is located above the trash can. The pivotable member is positionable in an attracting orientation with the interior end in contact with the ramp and the exterior end in a raised horizontal orientation. The pivotable member is positionable in a capturing orientation with the interior end raised above the ramp and the exterior end in a lowered angled orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a better rat trap system constructed in accordance with the principles of the present invention.

FIG. 2 is an exploded side elevational view taken along line 2-2 of FIG. 1.

FIG. 2A is an enlarged front elevational view taken at the lower extent of the upper trash can.

FIG. 2B is a left side elevational view taken along line 2C-2C of FIG. 2A.

FIG. 2C is a right side elevational view opposite from FIG. 2B.

FIG. 5 is a cross sectional view taken along line 5-5 of FIG. 3.

FIG. 5A is an enlarged showing taken at Circle 5 of FIG. 5A of FIG. 5

FIG. 6 is a cross sectional view similar to FIG. 5 but after capturing a rat.

The same reference numerals refer to the same parts throughout the various Figures for the various embodiments of the invention.

DESCRIPTION OF THE PREFERRED EMBODIMENT

Figure 3:
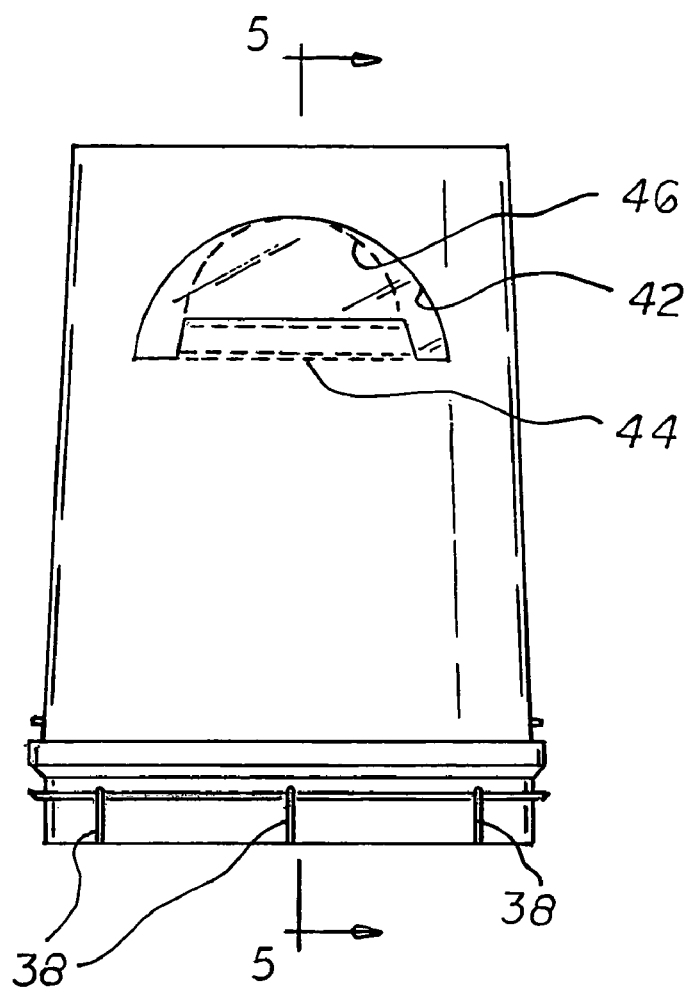
FIG. 3 is a rear elevational view of the upper bucket along line 3-3 of FIG. 2.
Figure 4:
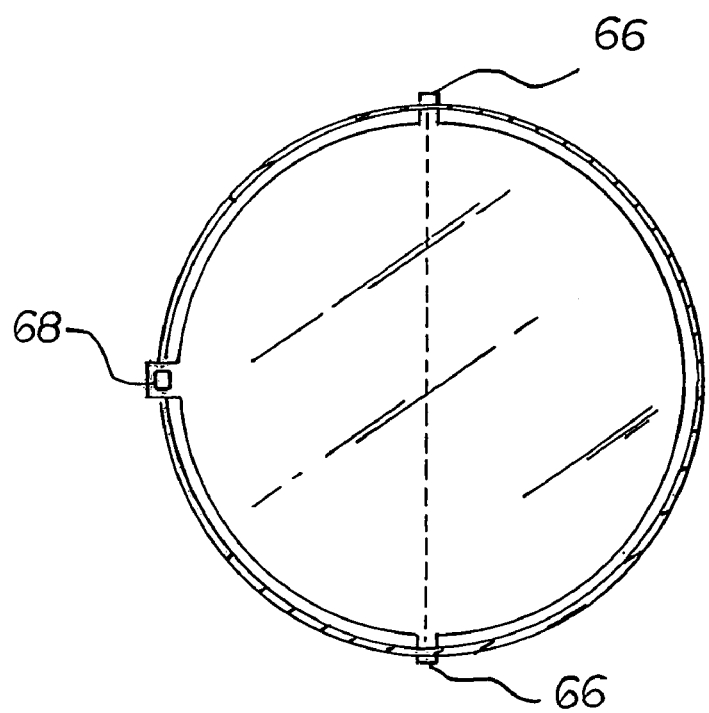
FIG. 4 is a cross sectional view taken along line 4-4 of FIG. 2.

With reference now to the drawings, and in particular to FIG. 1 thereof, the preferred embodiment of the new and improved better rat trap system embodying the principles and concepts of the present invention and generally designated by the reference numeral 10 will be described.

The present invention, the better mouse trap system 10 is comprised of a plurality of components. Such components in their broadest context include an upper bucket, a lower opening, a flat, generally circular plate. Such components are individually configured and correlated with respect to each other so as to attain the desired objective.

First utilized is a lower bucket 14. The lower bucket has a closed bottom 16. The bottom is in a circular configuration. The lower bucket has an open top 18. The open top is in a circular configuration. The bottom and the top are separated by a height. The lower bucket has a frusto-conical side wall 20. The side wall is provided between the top and the bottom. The bottom is smaller than the top. The side wall terminating above. The lower bucket has a cylindrical lip 22. The lip is provided at the termination of the side wall. The lower bucket is essentially rigid. The lower bucket is fabricated of a plastic or metal material.

An upper bucket 26 is provided. The upper bucket has a closed top 28. The top is in a circular configuration. The upper bucket has an open bottom 30. The bottom is in a circular configuration. The bottom and the top are separated by a height. The upper bucket has a frusto-conical side wall 32. The side wall is provided between the top and the bottom. The top is smaller than the bottom. The side wall terminates below. The upper bucket has a cylindrical lip 34. The lip is provided at the termination of the side wall. The upper bucket is essentially rigid. The upper bucket is fabricated of a plastic material. The upper bucket has a front. The front of the upper bucket has an arcuate cut-out 36. The cut-out extends upwardly from the bottom. The upper bucket has vertical slots 38. The vertical slots extend upwardly from the cut-out. The cut-out and slots facilitate the releasable coupling of the upper bucket onto the lower bucket.

Provided next is an upper opening 42. The upper opening is cut into an upper extent of the side wall of the upper bucket. The upper opening has a horizontal upper slit 44. The upper slit extends circumferentially for about 120 degrees, plus or minus 10 percent, of the side wall diametrically opposed to the arcuate cut-out. The upper opening has an arcuate upper slit 46. The slit extends upwardly from the upper slit to a height of between 15 and 25 percent of the height of the upper bucket. Horizontal shelving 48 is provided. The horizontal shelving is provided at the upper slit. Bait 50 is utilized. The horizontal shelving supports the bait. A transparent sheet 52 is provided. The transparent sheet is removably coupled to the upper opening.

A lower opening 56 is provided. The lower opening is cut into the side wall of the upper bucket. The lower opening has a horizontal lower slit 58. The lower slit extends circumferentially for about 160 degrees, plus or minus 10 percent, at a lower extent of the side wall above the cut-out. The lower opening has an arcuate upper slit 60. The upper slit extends upwardly from the lower slit to a height of between 20 and 30 percent of the height of the upper bucket.

A flat, generally circular plate 64 is provided next. The plate has laterally extending pivot pins 66. The plate has forwardly extending upper magnets. In the preferred embodiment, the magnets include a larger lower magnet 68 on one side and a smaller upper magnet 69 on the other side. The system thus may be adapted for larger or smaller animals depending on the orientation of the circular plate in the system, right side up or up side down. The plate has pivot apertures 70. The pivot apertures extend through the upper bucket at diametrically opposed locations adjacent to the lower slit. The pivot apertures rotatably receive the pivot pins for effecting movement of the plate between a horizontal orientation and a pivoted orientation. The horizontal orientation separates a retaining space in the lower bucket from a capturing space in the upper bucket. Note FIG. 5. The pivoted orientation causes an animal on the plate remote from the lower opening to fall into the lower bucket. Note FIG. 6. The plate has a lower metal strip 72. The lower metal strip is secured to the upper bucket adjacent to a central extent of the lower slit. The lower metal strip receives and retains the upper magnet and plate in the horizontal orientation until an animal is upon the plate remote from the lower opening. The upper bucket has a transverse opening 74. The transverse opening is between the lower opening and one of the pivot apertures. In this manner the plate may be added to and removed from the system.

Further provided is a semicircular platelet 78. The platelet is secured to the upper bucket adjacent to the lower slit and beneath half of the plate when in the horizontal orientation. Each of the pivot apertures in the side wall of the upper bucket have a lower horizontal face 80. In this manner the plate is supported in a horizontal orientation. Each pivot aperture has an arcuate face 82. In this manner pivoting of the plate is allowed. Each pivot aperture has a radial face 84. In this manner pivoting of the place is limited. One pivot aperture has a vertical finger 86. In this manner an animal within the lower bucket is precluded from moving the plate from a horizontal orientation. The plate and platelet are fabricated of a rigid transparent material. Joining the platelet to the upper bucket, as well as the joining of other joined components, is preferably effected through an adhesive, normally a hot melt adhesive.

Provided last is a ramp 90. The ramp is fabricated of a rigid material. The ramp has an upper end 92. The upper end is removably coupled to the upper bucket at the lower opening. In this manner animals are allowed to enter the upper bucket.

In operation and use, the system is placed on a floor or other horizontal surface. The ramp is attached to the lower opening of the upper bucket for allowing rats and other animals to be captured, retained and destroyed. Upon entering the upper bucket, an animal will walk onto the horizontal plate adjacent to the lower opening. The plate will not pivot due to the fixed platelet below the plate and the animal. Upon walking on the plate to a location remote from the lower opening, as while reaching for the food at the upper opening, the plate will pivot since there is no platelet below the animal. With the plate pivoting, the animal will fall into the lower bucket. Thereafter the plate will return to the horizontal orientation and the animal is trapped. The transparency in the upper opening provides an apparent opening for animals to lure them over the interior half of the pivotable plate to ensure their capture.

The upper bucket is adapted to be positioned into a hole in the lid of a large bucket. In addition, the lower bucket is adapted to be filled with water to accelerate the killing of the trapped animals.

In order to remove the rats and the other animals from the lower bucket and the system, the user simply removes the transparent sheet from the upper opening and then turns the system upside down. The rats and other animals are the effectively poured out of the system where after the system is re-deployed for further capturing, retaining and destroying.

It should be understood that the upper bucket is adapted to be coupled to any of a variety of lower containers. For example, the upper bucket is adapted to be coupled to a larger bucket of the type which is lifted and inverted by a municipal trash handling truck. User involvement is thus eliminated except for proper position of the upper bucket and lower container and the removal of the transparent sheet.

Figure 7:
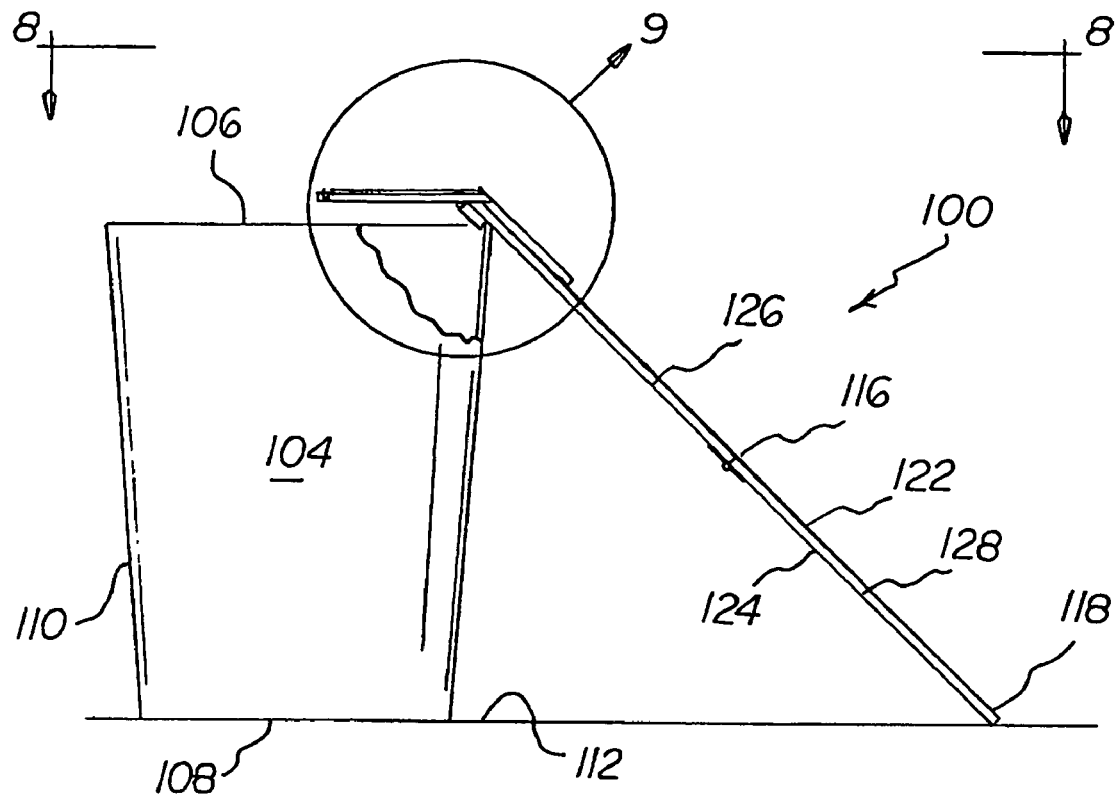
FIG. 7 is a side elevational view of another better rat trap system constructed in accordance with the principles of the present invention.
Figure 8:
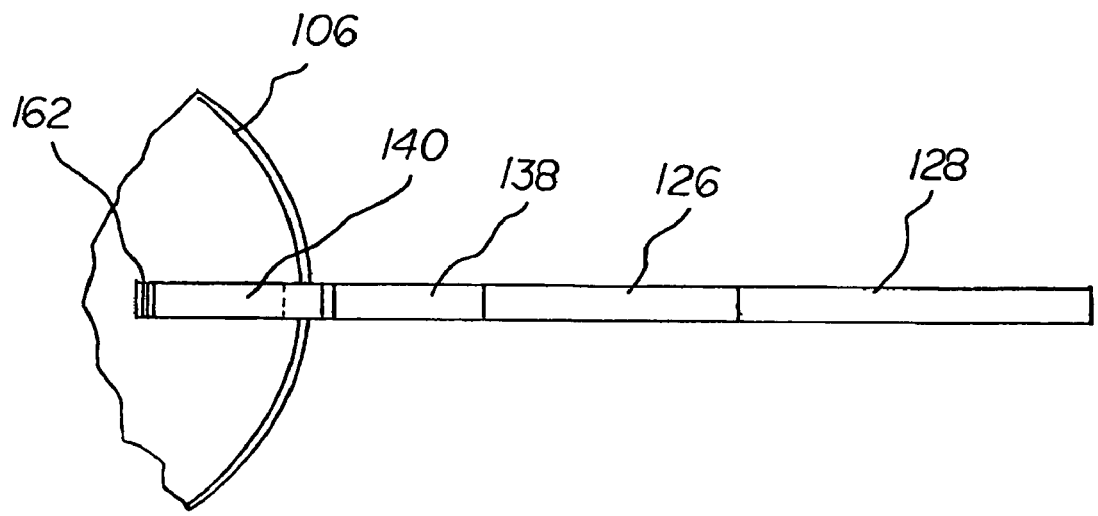
FIG. 8 is a plan view of the system taken along line 8-8 of FIG. 7.
Figure 9:
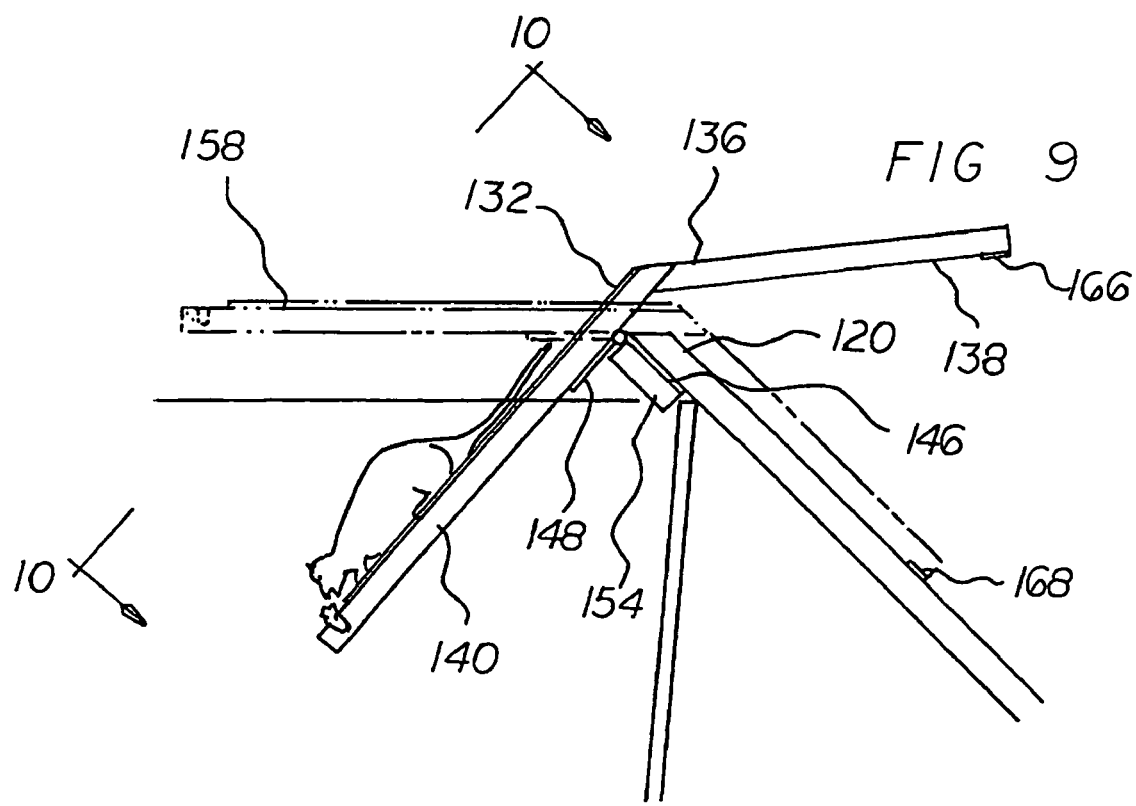
FIG. 9 is an enlarged side elevational view taken at Circle 9 of FIG. 7.
Figure 10:
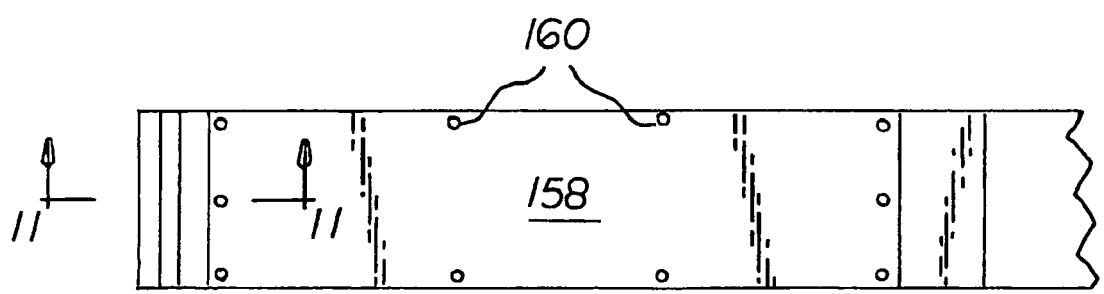
FIG. 10 is plan view of the system taken along line 10-10 of FIG. 9.
Figure 11:
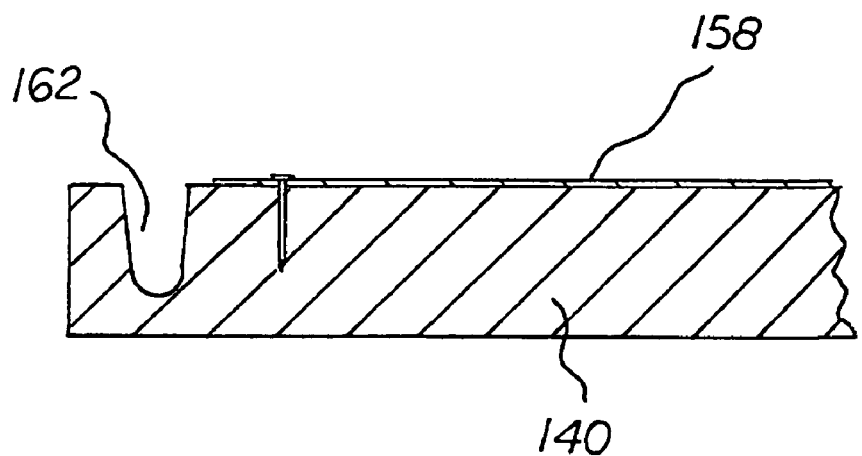
FIG. 11 is a cross sectional view taken along line 11-11 of FIG. 10.
Figure 12:
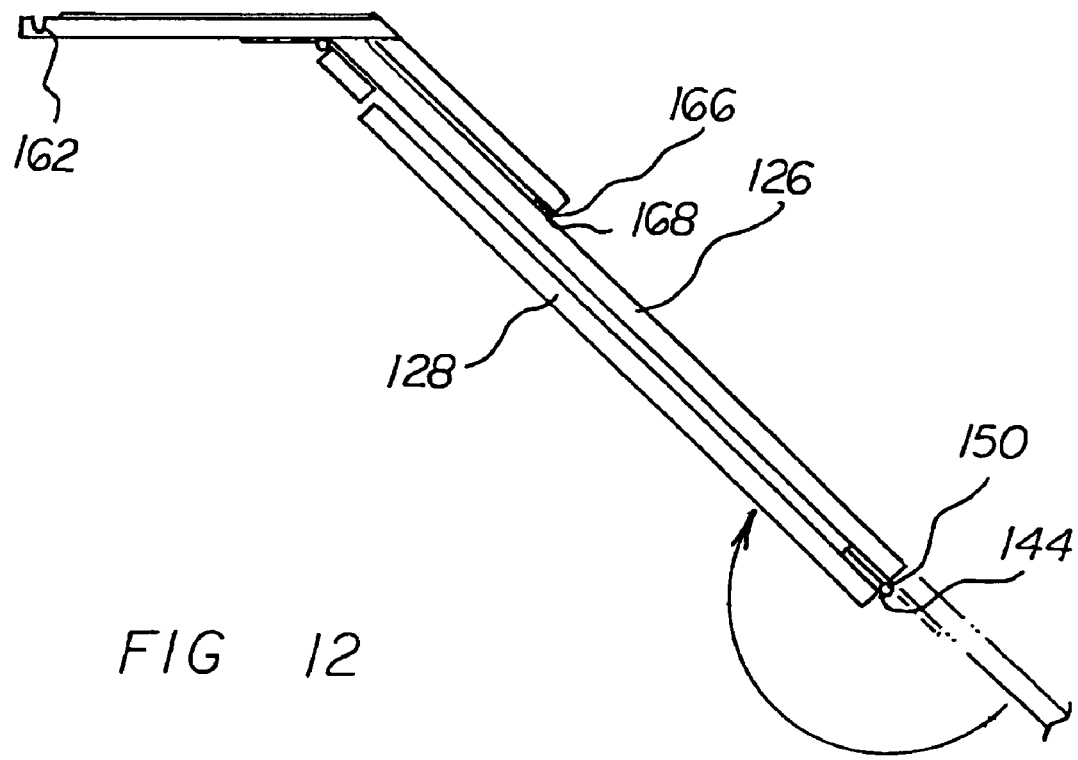
FIG. 12 is a side elevational view similar to FIGS. 1 and 9 but in a folded orientation for storage and transportation.

Another better rat trap system 100 for capturing, retaining and destroying rats and other undesirable animals is shown in FIGS. 7 through 12. The capturing and retaining and destroying are done in a safe, humane, convenient and reliable manner. First provided is a trash can 104. It should be understood that any type of trash can, of any size or material, could readily be utilized in the present invention. The trash can has an open top 106 and a closed bottom 108 and a side wall 110 in a frusto-conical configuration. The trash can is fabricated of a polymeric material. A recipient surface 112 supports the bottom of the trash can.

Next provided is a ramp 116. The ramp has a lower first end 118 and a raised second end 120. The ramp has an upper surface 122 and a lower surface 124. The first end of the ramp is positioned on the recipient surface. The second end of the ramp is positioned on the top of the trash can. The ramp is split into a top half 126 and a bottom half 128. A 180 degree hinge couples the upper and lower halves for movement between an extended attracting orientation and a retracted folded orientation.

Provided next is a pivotable member 132. The pivotable member is pivotally supported at the second end of the ramp. The pivotable member has an upper surface 134 and a lower surface 136. The pivotable member has an interior end 138 located above the ramp and an exterior end 140 located above the trash can. The interior and exterior ends of the pivotable member are fixed with respect to each other at an angle of 135 degrees, plus or minus 10 percent. The pivotable member is positionable in an animal attracting orientation with the interior end of the pivotable member in contact with the ramp and the exterior end of the pivotable member in a raised horizontal orientation. The pivotable member is positionable in a rodent capturing orientation with the interior end of the pivotable member raised above the ramp and the exterior end of the pivotable member in a lowered angled orientation.

A 45 degree hinge 144 is next provided. The 45 degrees hinge has a fixed part 146 secured to the lower surface of the ramp adjacent to the pivotable member. The 45 degree hinge has a movable part 148 secured to the lower surface of the exterior section of the pivotable member adjacent to the interior section. The 45 degree hinge has a pivot pin 150 coupling the fixed and movable parts of the hinge to thereby move the pivotable member between the attracting and capturing orientations.

Next, a stop block 154 is provided. The stop block is secured beneath the fixed part of the hinge to limit the downward rotation of the pivotable member from the horizontal to a lowered 45 degrees, plus or minus 10 percent.

A plate 158 is next provided. The plate is secured by nails 160 to the upper surface of the exterior end of the pivotable member. The plate is fabricated of a hard material selected from the class of hard materials including metal and Formica to preclude an animal on the exterior end of the pivotable member from digging its claws into the pivotable member to abate falling into the trash can.

Next, a notch 162 is provided in the upper surface of the pivotable member at the exterior end remote from the interior end. The notch functions to support bait to attract animals. Animals attracted by the bait climb up the ramp and across the interior end and then across the exterior end of the pivotable member and fall into the trash can due to the pivoting of the pivotable member.

Lastly, a pair of magnets 166, 168 is provided. One magnet 166 is on the lower surface of the pivotable member and the other magnet 168 is on the upper surface of the ramp. The magnets tend to hold the pivotable member in the attracting orientation. When the animal walks to the exterior section of the pivotable member, the pivotable member moves to the capturing orientation. Note FIG. 9.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A better rat trap system for capturing, retaining and destroying rats and other undesirable animals, the system comprising, in combination:

a trash can having an open top and a closed bottom and a side wall in a frusto-conical configuration, the trash can being fabricated of a polymeric material, a recipient surface supporting the bottom of the trash can;

a ramp having a lower first end and a raised second end, the ramp having an upper surface and a lower surface, the first end of the ramp positioned on the recipient surface, the second end of the ramp positioned on the top of the trash can, the ramp being split into a top half and a bottom half with a 180 degree hinge coupling the upper and lower halves for movement between an extended attracting orientation and a retracted folded orientation;

a pivotable member pivotally supported at the second end of the ramp, the pivotable member having an upper surface and a lower surface, the pivotable member having an interior end located above the ramp and an exterior end located above the trash can, the interior and exterior ends of the pivotable member being fixed with respect to each other at an angle of 135 degrees, plus or minus 10 percent, the pivotable member positionable in an animal attracting orientation with the interior end of the pivotable member in contact with the ramp and the exterior end of the pivotable member in a raised horizontal orientation, the pivotable member positionable in a rodent capturing orientation with the interior end of the pivotable member raised above the ramp and the exterior end of the pivotable member in a lowered angled orientation;

a 45 degree hinge having a fixed part secured to the lower surface of the ramp adjacent to the pivotable member, the 45 degree hinge having a movable part secured to the lower surface of the exterior section of the pivotable member adjacent to the interior section, the 45 degree hinge having a pivot pin coupling the fixed and movable parts of the hinge to thereby move the pivotable member between the attracting and capturing orientations;

a stop block secured beneath the fixed part of the hinge to limit the downward rotation of the pivotable member from the horizontal to a lowered 45 degrees, plus or minus 10 percent;

a plate secured by nails to the upper surface of the exterior end of the pivotable member, the plate being fabricated of a hard material selected from the class of hard materials including metal and Formica to preclude an animal on the exterior end of the pivotable member from digging its claws into the pivotable member to abate falling into the trash can;

a notch in the upper surface of the pivotable member at the exterior end remote from the interior end for supporting bait to attract animals climbing up the ramp and across the interior end and then across the exterior end of the pivotable member to fall into the trash can due to the pivoting of the pivotable member; and a pair of magnets, a first magnet on the lower surface of the pivotable member and a second magnet on the upper surface of the ramp, the magnets being held together when in the attracting orientation awaiting the animal, the pivotable member movable to the capturing orientation with the magnets separated as a result of the animal walking to the exterior section of the pivotable member.

* * * * *